United States Patent [19]

Zammit et al.

[11] 3,710,194

[45] Jan. 9, 1973

[54] CONCEALED ADJUSTABLE ELEMENT FOR ELECTRONIC CIRCUIT CARDS

[75] Inventors: Frank X. Zammit, Birmingham; Anthony G. Schad, Sterling Hts., both of Mich.

[73] Assignee: Westinghouse Electric Corporation, Pittsburgh, Pa.

[22] Filed: Feb. 11, 1971

[21] Appl. No.: 114,507

[52] U.S. Cl...317/101 R, 317/101 DH, 317/101 CC, 317/118

[51] Int. Cl.........H02b 1/04

[58] Field of Search......174/68.5; 317/101 R, 101 C, 317/101 CC, 101 DH, 118; 200/166 CP, 167 A, 11 R, 11 DA, 170 R, 61.42; 338/197, 68; 334/7; 179/107 R, 10 S

[56] References Cited

UNITED STATES PATENTS

| | | | |
|---|---|---|---|
| 2,495,546 | 1/1950 | Posen et al | 317/101 R |
| 2,640,099 | 5/1953 | Hull | 317/101 R X |
| 2,810,068 | 10/1957 | Weisz et al | 317/101 C X |
| 2,891,116 | 6/1959 | Nichols | 179/107 R |
| 2,963,577 | 12/1960 | Errichiello et al. | 317/101 R X |
| 3,008,245 | 11/1961 | Meuche | 317/101 C X |
| 3,015,704 | 1/1962 | Behymer | 179/107 R |
| 3,046,798 | 7/1962 | Igarashi | 179/107 R X |
| 3,119,903 | 1/1964 | Rosemond et al | 179/107 S |
| 3,456,162 | 7/1969 | Hill | 317/101 R X |
| 3,259,806 | 7/1966 | Reed | 317/101 DH |
| 3,329,919 | 7/1967 | Lau | 338/68 |
| 3,191,097 | 6/1965 | Dano et al. | 174/52 X |

*Primary Examiner*—Richard B. Wilkinson
*Assistant Examiner*—U. Weldon
*Attorney*—A. T. Stratton and Clement L. McHale

[57] ABSTRACT

An electronic circuit card having a panel positioned along the front edge of the card to conceal an adjustable circuit element mounted on the card directly behind the panel. A movable actuator for adjusting the element is positioned to be manually accessible by inserting one's finger over the top edge of the panel.

9 Claims, 3 Drawing Figures

INVENTORS
FRANK X. ZAMMIT
ANTHONY G. SCHAD
BY
Barnes, Kisselle, Raisch & Choate
ATTORNEYS

CONCEALED ADJUSTABLE ELEMENT FOR ELECTRONIC CIRCUIT CARDS

This invention relates to electronic circuit cards and more specifically to plug-in type cards which are used in electronic controllers for apparatus such as a machine tool.

An electronic circuit card comprises a plurality of electronic components mounted on a flat, rigid, non-conductive board, usually of glass phenolic. These components are electrically connected together by conductive paths on the card to form one or more electronic circuits. Generally a particular circuit card is designed to perform a particular circuit function, and hence various numbers of different cards are used in constructing a complex electronic controller. The cards are usually rectangularly shaped and arranged in stacked fashion with-in a control cabinet. Preferably, the electronic circuits on each card terminate in a plurality of flat connector strips at one edge thereof. This edge is insertable into a terminal block within the control cabinet to register each strip with a corresponding electrical terminal in the terminal block. Each terminal is in turn wired within the cabinet to one or more terminals in the same or other terminal blocks in accordance with the design of the controller. In this way the individual circuits of each card are electrically connected to the individual circuits of other cards to properly construct a controller for producing the desired machine operating sequence. The use of circuit cards is particularly desirable in complex electronic circuitry because should a circuit malfunction, it may be conveniently replaced without rewiring any components by simply bodily removing the defective card and inserting a new card.

In an electronic controller for a machine tool it is often necessary to adjust or calibrate a specific circuit to obtain proper machine operation. This is usually done with adjustable circuit elements such as potentiometers, variable capacitors, etc. However, when an electronic controller is constructed from a plurality of stacked cards, such adjustments often are difficult to make. In some constructions, the adjustable element is so positioned on a card that it is necessary to use a tool such as a screwdriver to perform the adjustment. This particular arrangement is undesirable because when the tool is inserted into the stack of cards, it may possibly short out various components on the cards. Another way in which adjustment may be made is by removing the circuit card to be adjusted, inserting an extender board into the terminal block from which the card was removed and connecting the circuit card to the extender board. The extender board comprises a plurality of conductive strips electrically connecting the card to be adjusted with the terminal block from which it was removed. With the card spaced forwardly of the stack it may now be adjusted. The inconvenience of this method renders it undesirable also. Moreover, when the manner in which an adjustment can be made is readily apparent upon visual examination of the circuit card, it may encourage adjustment by individuals who are either unfamiliar with the controller or unauthorized to perform the adjustment. Consequently, more harm than good can often result.

Therefore, it is an object of this invention to provide an improved electronic circuit card in which an adjustable circuit element is positioned for convenient manual adjustment.

It is also an object of the invention to provide an improved electronic circuit card which does not require the use of a tool to adjust an electronic circuit element thereon.

Likewise, another object of the invention is to provide an improved electronic circuit card for a controller in which a circuit element may be adjusted without removing the card from its installed position in the controller.

A further object of the invention is the provision of an improved electronic circuit card for an electronic controller in which an adjustable circuit element, while being positioned for convenient manual operation, is also concealed from view so as to be not readily apparent to those who are unfamiliar with the controller.

Other objects and features of the invention will become apparent in the following description and drawings in which.

Figures 1, 2, 3:
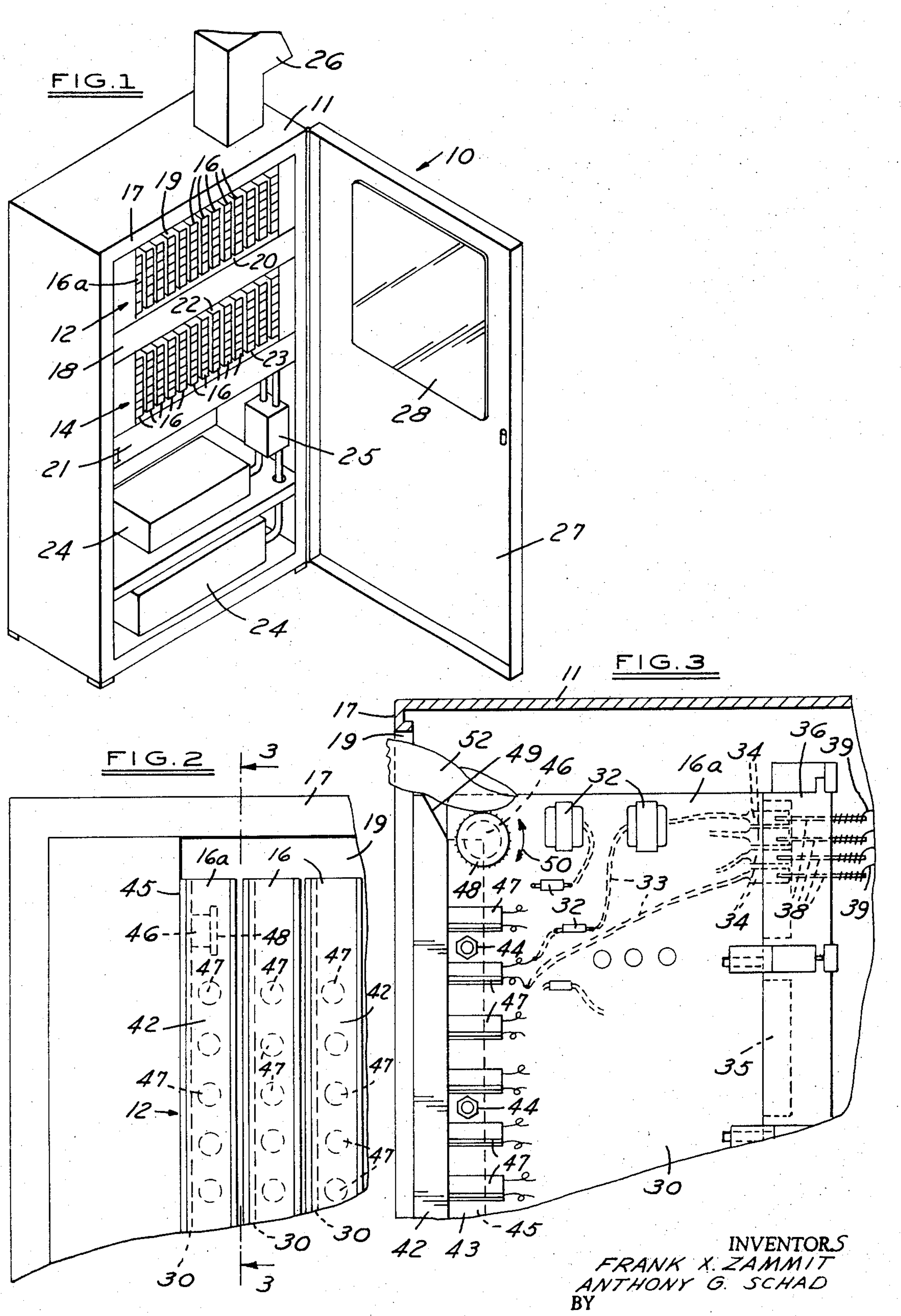
FIG. 1 is a perspective view showing an electronic controller for a machine tool having a plurality of improved electronic circuit cards of the present invention.
FIG. 2 is a fragmentary front elevational view of the controller of FIG. 1.
FIG. 3 is a fragmentary sectional view taken along line 3—3 in FIG. 2.

Referring now to the drawings, FIG. 1 shows an electronic controller 10 for a machine tool (not shown). Controller 10 comprises control cabinet 11 which contains two horizontal rows 12 and 14 of various electronic circuit cards 16. Horizontally adjacent cards 16 in each row 12 and 14 are spaced closely together in stacked fashion. Row 12 is vertically separated from the top flange 17 of cabinet 11 and from a horizontal cabinet partition 18 by two small spaces 19 and 20 respectively. Row 14 is similarly separated from partitions 18 and 21 by spaces 22 and 23. The lower portion of cabinet 11 may house several power supplies 24 for circuit cards 16 and junction boxes 25 which connect wiring from the machine tool, which enters cabinet 11 through duct 26, with the circuitry of controller 10. A front door 27 provides access to the components within cabinet 11 and includes a window 28 through which circuit cards 16 may be observed when the door is closed.

Referring also to FIGS. 2 and 3, each card 16 comprises a flat, rectangularly shaped, glass phenolic board 30 on which are mounted various electronic circuit components 32. Components 32 are electrically connected to form various electronic circuits 33, some of which terminate in flat conductive strips 34 at the rear edge, or border, 35 of board 30. Edge 35 is inserted into a terminal block 36 which is fixedly mounted within cabinet 11. Each strip 34 registers with a terminal 38 in block 36 to form an electrical connection therebetween. Each terminal 38 is in turn wired by leads 39 to one or more other terminals of the same or other terminal blocks within cabinet 11. Each card 16 further includes a rigid panel 42 which is attached along the front edge, or border, 43 of board 30 by fasteners 44 which secure a flange 45 of panel 42 flat against board 30. Panel 42 extends the full height of board 30 at the front edge thereof and transversely from the plane thereof a distance substantially greater than the thickness of board 30. The top and bottom rear corners of panel 42 are generously chamfered as at 49 to permit card 16 to be removed from terminal block 36 by first inserting one's finger over the top and bottom of panel 42 behind chamfers 49 and by then bodily pulling the card directly away from the terminal block. Panel 42 also provides a mounting structure for indicator lamps 47 on some of the cards 16 which may be viewed through window 28 on cabinet door 27 to indicate the operating status of controller 10. Because, as was pointed out, the transverse extent or width of panel 42 is much greater than the thickness of board 30, panel 42 also conceals components 32 when viewed from the front of cabinet 11.

Card 16*a* (FIG. 2) includes a potentiometer 46 positioned directly behind the top chamfer 49 of panel 42 on the upper front corner of board 30. Potentiometer 46 is adjustable by means of a knurled thumb wheel 48 which may be rotated in opposite directions as indicated by arrows 50 (FIG. 3).

The electronic logic circuitry on each card 16 is arranged to control various functions of the machine tool in predetermined sequence. For example, a particular card may control the actuation of a solenoid valve for advancing a slide of a machine tool. To operate the machine tool in proper sequence, it may be necessary to adjust the slide operation in relation to the operation of other machine elements. For example, it may be necessary to adjustably delay the slide advance after a tool in the path of the slide has been retracted. This delay function may be performed by the electronic logic circuitry and may be adjusted by adjusting a component of that circuitry.

Therefore, potentiometer 46 is electrically connected to vary the response characteristics of the circuit on card 16*a* to thereby adjust the delay in the slide advance. With the card construction of this invention, adjustment of potentiometer 46 is easily performed by inserting a finger 52 through space 19 to rotate the top of thumb wheel 48. Potentiometer 46, while being conveniently positioned for adjustment by authorized individuals, is protected from adjustment by unauthorized persons by panel 42 which conceals thumb wheel 48 from view from the front of cabinet 11. Chamfer 49 allows panel 42 to be gripped in the conventional manner for removing card 16a without interfering with thumb wheel 48.

While the improved circuit card construction has been described with potentiometer 46 positioned directly behind panel 42 at the upper front corner of board 30, it should be appreciated that potentiometer 46 may also be positioned directly behind panel 42 at the lower front corner of board 30. In this case, one's finger 52 is inserted through space 20 at the bottom of the card to rotate thumb wheel 48. Similarly, it should be recognized that it is not necessary for panel 42 to extend the full height of card 16a so long as potentiometer 46 is positioned behind it so as to be accessible for adjustment while still being concealed from view. Likewise, it should be appreciated that different types of adjustable circuit elements may be positioned at these locations instead of a potentiometer and that the means for adjusting those elements may be levers or the like instead of a thumb wheel.

We claim:

1. In an electronic circuit card of the type comprising a generally planar board having a forward edge portion, a plurality of electronic components on said board, a plurality of terminals on said board adapted to be engaged with a plurality of corresponding terminals in an electrical panel and means on said board for electrically connecting said components in circuit with said terminals on said board, that improvement which comprises a panel secured to said board and supported thereby having upper and lower ends and extending transversely of the plane of the board adjacent said forward edge portion thereof, an adjustable circuit element electrically connected in circuit on said board and having an adjustable electrical parameter and an actuator for adjusting said adjustable element, said actuator being operatively connected to said adjustable element and disposed adjacent to said adjustable element proximate said forward edge within finger reach of one end of said panel and manually movable to continuously adjust said element, said actuator being located behind said panel so as to be concealed thereby and in a position to be manually accessible around one end of said panel from the forward side thereof.

2. The circuit card of claim 1 wherein said actuator extends transversely of the plane of said board a distance less than the transverse extent of said panel from the plane of said board.

3. The circuit card of claim 1 wherein said panel is substantially co-extensive in length with the forward edge of the board.

4. The circuit card of claim 1 wherein said actuat-or comprises a rotary member whose axis is substantially perpendicular to the plane of said board.

5. The circuit card of claim 4 wherein said rotary member is a wheel.

6. In an electronic circuit card of the type comprising a generally planar board having forward and rear borders and upper and lower borders, a plurality of electronic components on said board, a plurality of terminals on said board adjacent one of said borders and adapted to be engaged with a plurality of corresponding terminals in an electrical panel when said card is inserted into said panel and means on said board for electrically connecting said components in circuit with said terminals on said board, that improvement which comprises a front panel having upper and lower ends and extending transversely of said board and secured to the forward border thereof and supported by said board, an adjustable circuit element electrically connected in circuit on said board having an adjustable electrical parameter, an actuator for continuously adjusting said adjustable element whereby said electrical parameter is varied, said actuator being supported on said card and disposed adjacent to said adjustable element proximate said forward border within finger reach of one end of said panel, said front panel being positioned and dimensioned to conceal said actuator when said panel is viewed from the front of the card, said actuator being manually accessible from the front of said card.

7. The circuit card of claim 6 wherein said panel extends transversely of the plane of said board a distance greater than the transverse extent of said actuator from said board.

8. The circuit card of claim 6 wherein said panel extends substantially the full length of the forward border and wherein said actuator is positioned adjacent the upper border of said board directly rearwardly of said panel.

9. The circuit card of claim 8 wherein said panel extends transversely of the plane of said board a distance greater than the transverse extent of said actuator from said board.

* * * * *